US012643497B2

(12) United States Patent　　　(10) Patent No.:　　US 12,643,497 B2
Okamoto　　　　　　　　　　　　(45) Date of Patent:　　　Jun. 2, 2026

(54) BUMPER ASSEMBLY

(71) Applicant: TOYOTA JIDOSHA KABUSHIKI KAISHA, Toyota (JP)

(72) Inventor: Takashi Okamoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 18/400,610

(22) Filed: Dec. 29, 2023

(65) Prior Publication Data

US 2024/0217466 A1　　Jul. 4, 2024

(30) Foreign Application Priority Data

Jan. 4, 2023　(JP) ................................. 2023-000116

(51) Int. Cl.
　　B60R 19/02　　　(2006.01)
　　B60R 19/52　　　(2006.01)
(52) U.S. Cl.
　　CPC ............ B60R 19/023 (2013.01); B60R 19/52 (2013.01); B60R 2019/527 (2013.01)

(58) Field of Classification Search
　　CPC ....... B60R 19/023; B60R 19/52; B60R 19/48; B60R 19/04; B60R 2019/527; B60R 2019/1886
　　USPC ........................................................ 293/102
　　See application file for complete search history.

(56) References Cited

FOREIGN PATENT DOCUMENTS

| CN | 110588553 A | * | 12/2019 | ............. B60R 19/04 |
| CN | 221068000 U | * | 6/2024 | ............. B60R 19/04 |
| JP | H09-104298 A | | 4/1997 | |
| JP | 2000-289547 A | | 10/2000 | |
| JP | 2005-088827 A | | 4/2005 | |
| JP | 2005-306125 A | | 11/2005 | |
| JP | 2008-265567 A | | 11/2008 | |

* cited by examiner

*Primary Examiner* — Hai H Huynh
(74) *Attorney, Agent, or Firm* — Dinsmore & Shohl LLP

(57)　　　　　ABSTRACT

The bumper assembly comprises the skeleton component and a plurality of the decorative parts. The skeleton component extends from the center in the vehicle width direction to both sides. A plurality of the decorative parts are incorporated into the skeleton component. In addition, each of the decorative parts has the exposed surface. The exposed surface is part of the vehicle appearance.

7 Claims, 5 Drawing Sheets

BUMPER ASSEMBLY

CROSS REFERENCE TO RELATED APPLICATION

This application claims priority to Japanese Patent Application No. 2023-000116, filed on Jan. 4, 2023, which is incorporated herein by reference in its entirety including the specification, claims, drawings, and abstract.

TECHNICAL FIELD

Disclosed herein is a bumper assembly. The bumper assembly is comprised of a plurality of parts.

BACKGROUND

JP H9-104298 A and JP 2008-265567 A disclose a front bumper. The front bumper is divided into a plurality of components. That is, the front bumper is divided into a center bumper component and a pair of side bumper components. The front bumper disclosed in JP 2008-265567 A is divided an upper component and a lower component. Also disclosed in JP 2005-88827 A is a spoiler. The spoiler is provided at a lower portion of the front bumper. The spoiler is divided into three or more parts.

As the number of divisions of the bumper increases, it becomes difficult to transport the assembly. The assembly deforms, for example, as the bumper assembly is lifted. At this time, a bending load is applied to a joint portion (for example, a clip) connecting a plurality of parts. In order to prevent breakage of the clip, the assembly is lifted to support the joint portion from below. As the number of divisions increases, the portion supported from below increases. Thus, the greater the number of splits of the bumper, the more difficult it becomes to transport the assembly.

Accordingly, the present specification discloses a bumper assembly capable of suppressing a decrease in transportability even when the number of divisions is increased.

SUMMARY

Disclosed herein is a bumper assembly. The assembly comprises a skeleton component and a plurality of decorative components. The skeleton component extends from the center in the vehicle width direction to both sides. The plurality of decorative parts are assembled to the skeleton part. The each of decoration parts has an exposed surface. The exposed surface becomes part of the vehicle appearance.

According to the above configuration, the decoration component is assembled to the skeleton component. When transporting the bumper assembly, since the operator only needs to have a skeletal component, a deterioration in transportability is suppressed.

In the above-described configuration, an insertion hole may be formed in the skeleton component. A holding component for holding the wire harness is inserted into the insertion hole.

According to the above configuration, it is not necessary to form the structure for holding the wire harness on the decorative component. Therefore, the degree of freedom of design for the decorative component is improved.

In the above configuration, the skeletal component may be disposed in front of the radiator support. The radiator support is rectangular frame-shaped. A ventilation port is formed in the skeleton part facing the rectangular opening of the radiator support. Further, a baffle plate is formed on a surface of the skeleton component facing the radiator support and outside the ventilation port in the vehicle width direction. The baffle plate extends in the front-rear direction.

According to the above configuration, it is not necessary to form the baffle plate on the decorative component. Therefore, the degree of freedom of design for the decorative component is improved.

In the above configuration, the bumper assembly may comprise a base and an absorber. The base is attached to the radiator support. The absorber extends forward from the base. A guide bar is formed on the opposing surface of the skeletal component. The guide bar extends rearwardly. Further, a guide frame is formed on the base. The rear end of the guide bar is inserted into the guide frame.

According to the above configuration, the guide bar linearly moves rearward along the guide frame during a front collision of the vehicle. With this movement, the absorber collapses and deforms in the front-rear direction to absorb the impact.

In the above configuration, an opening may be formed in a portion of the skeleton component facing the front end of the absorber. This opening is larger in diameter than the front end of the absorber.

According to the above configuration, the absorber can receive a collision load from the decoration component without interfering with the skeleton component.

According to the bumper assembly disclosed in the present specification, even if the number of divisions is increased, it is possible to suppress a deterioration in transportability.

BRIEF DESCRIPTION OF DRAWINGS

The present disclosure will be further described with reference to the accompanying drawings, wherein like reference numerals refer to like parts in the several views, and wherein.

DESCRIPTION OF EMBODIMENTS

Figure 1:
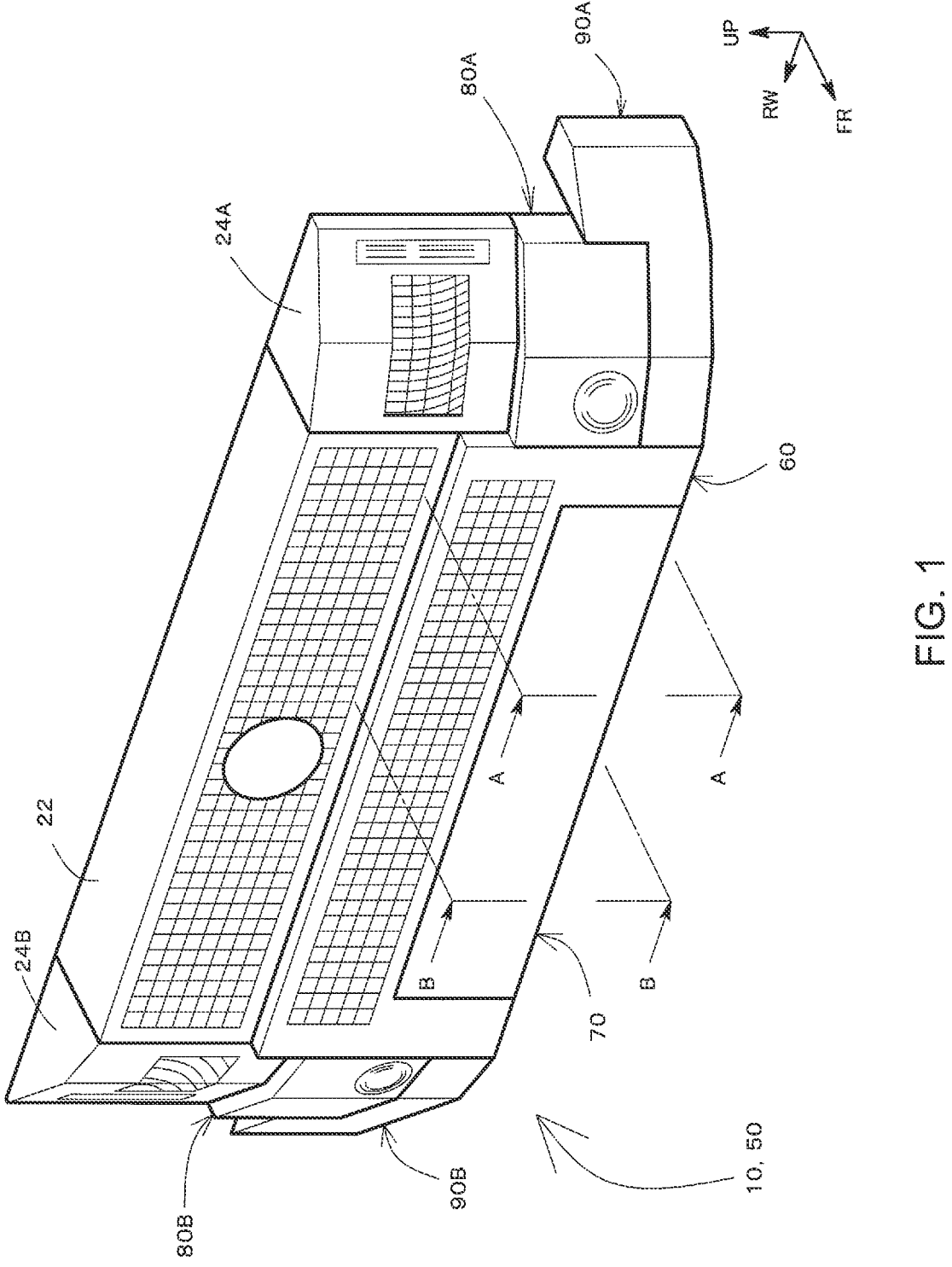
FIG. 1 is a perspective view illustrating a vehicle front structure including a bumper assembly according to the present embodiment.

Hereinafter, a bumper assembly 10 according to the present embodiment will be described with reference to the drawings. The shapes, materials, numbers, and numerical values described below are illustrative. These examples can be appropriately changed according to the specifications of the bumper assembly 10. In the following, the same reference numerals are given to the same elements in all the drawings.

In FIGS. 1-5, an orthogonal coordinate system is used to represent the position and direction of each component. The orthogonal coordinate system has an FR axis, an RW axis, and an UP axis. The FR axis is a vehicle longitudinal axis whose positive direction is the front of the vehicle. The RW axis is a vehicle width direction axis whose positive direction is the right side of the vehicle. The UP axis is a vertical axis of the vehicle in which the upward direction is a positive direction.

Vehicle Front Structure

FIG. 1 illustrates a front structure of a vehicle. This structure comprises a bumper assembly 10, a front grille 22, and headlamp assemblies 24A, 24B.

Figure 2:
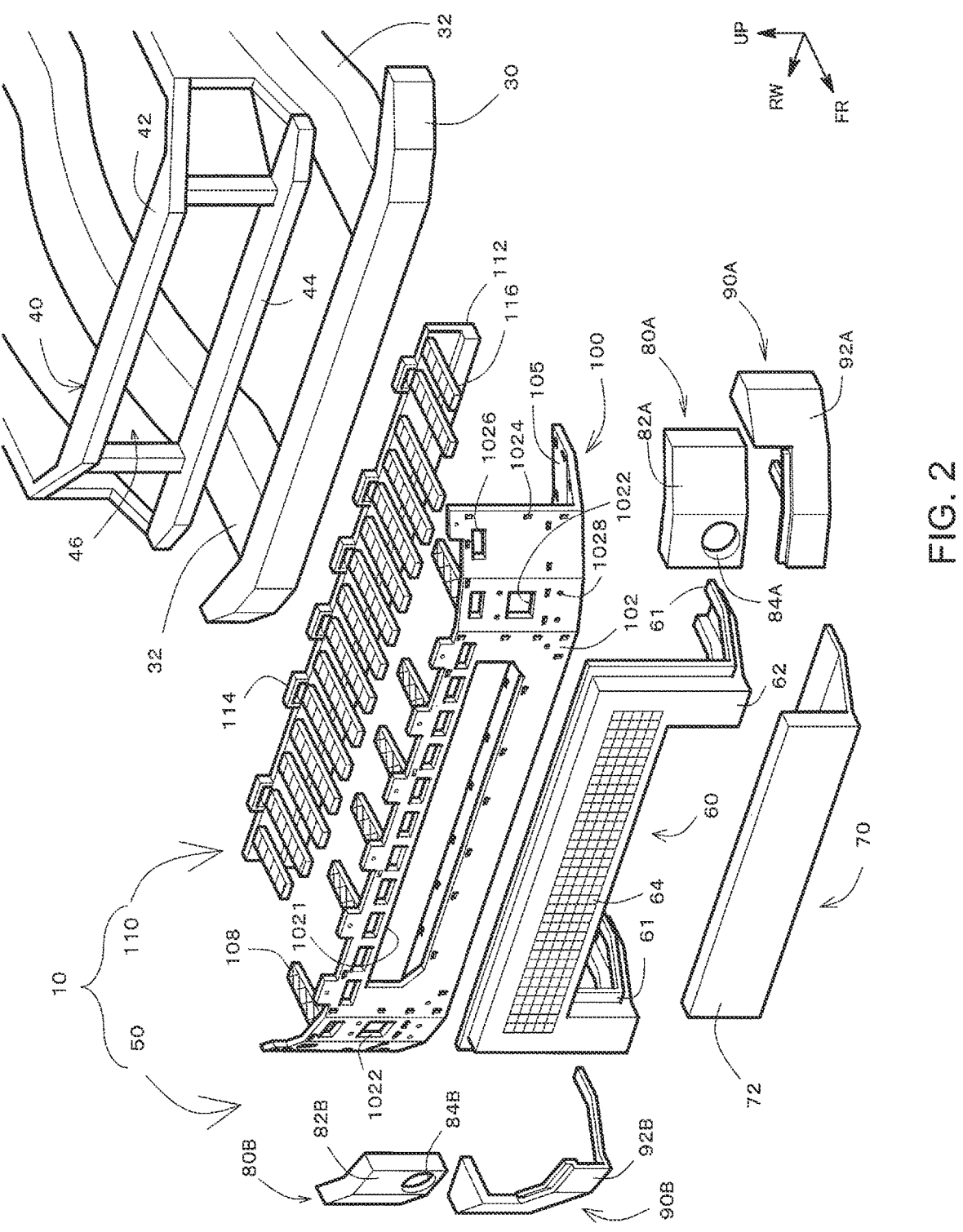
FIG. 2 is an exploded perspective view illustrating components of the bumper assembly according to the present embodiment.

The bumper assembly 10 is a shock absorbing component. The bumper assembly 10 receives a collision load and deforms during a front collision of the vehicle. As illustrated in FIG. 2, the bumper assembly 10 includes a panel assembly 50 and an absorber assembly 110. The panel assembly 50 is a so-called bumper panel. The absorber assembly 110 receives impact loads. These detailed structures will be described later.

As illustrated in FIG. 1, the front grille 22 and the headlamp assemblies 24A, 24B are assembled above the panel assembly 50. More specifically, the front grille 22 and the headlamp assemblies 24A, 24B are assembled to the skeleton component 100 (see FIG. 2) of the panel assembly 50. For example, the front grille 22 and the headlamp assemblies 24A. 24B are assembled to the skeleton component 100 by screw/bolt fastening.

Vehicle Screen

FIG. 2 illustrates components of the bumper assembly 10 according to the present embodiment and skeleton components of the front surface of the vehicle. As a skeletal component on the front surface of the vehicle, the vehicle comprises a bumper reinforcement 30 and a radiator support 40.

The bumper reinforcement 30 extends in the vehicle width direction on the front surface of the vehicle. For example, the bumper reinforcement 30 extends over the entire width of the vehicle. The rear end of the bumper reinforcement 30 is connected to, for example, the front end of the frame 32.

Above the bumper reinforcement 30, the radiator support 40 is disposed. The radiator support 40 has a rectangular frame shape when viewed from the front. A radiator (not shown) is fixed to the rectangular opening 46 of the radiator support 40.

A bumper assembly 10 and a front grille 22 illustrated in FIG. 1 are assembled to the bumper reinforcement 30 and the radiator support 40. For example, the panel assembly 50 is part of the bumper assembly 10. The panel assembly 50 is attached to the bumper reinforcement 30.

Figure 5:
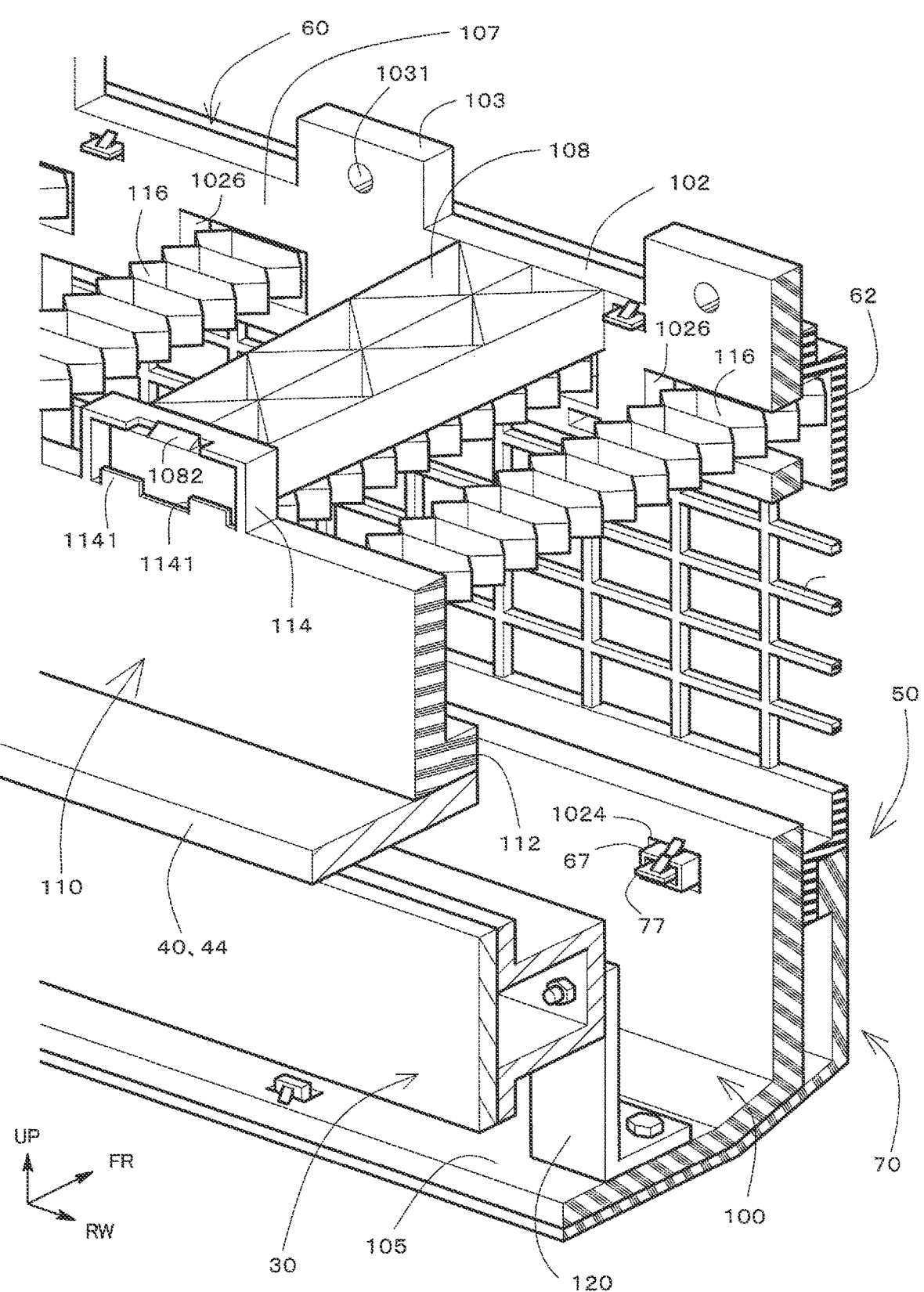
FIG. 5 is a perspective view showing an example in which the bumper assembly according to the present embodiment is installed in front of the vehicle, and is a perspective view of the front portion of the vehicle as viewed from a section B-B of FIG. 1.

More specifically, as illustrated in FIG. 5, among the components of the panel assembly 50, the skeleton component 100 is attached to the bumper reinforcement 30. This assembly is performed, for example, via a bracket 120. For example, the bottom plate 105 of the skeleton component 100 is fastened to the bumper reinforcement 30 via brackets 120.

A flange 103 is formed at the upper end of the skeleton component 100. A fastening hole 1031 is formed in the flange 103. Also, a fastening hole (not shown) is drilled at the lower end of the front grille 22 (see FIG. 1). These fastening holes are aligned with each other, and a bolt is screwed in. The upper end of the front grille 22 is fastened to the upper frame 42 of the radiator support 40 (see FIG. 2).

The absorber assembly 110 is also part of the bumper assembly 10, and the absorber assembly 110 is fastened to the radiator support 40. More specifically, as illustrated in FIG. 5, the base 112 of the absorber assembly 110 is fastened to the lower frame 44 of the radiator support 40.

Panel Assembly

Referring to FIG. 2, panel assembly 50 comprises the skeleton component 100 and a plurality of decorative components. The decorative component of the panel assembly 50 is divided into a plurality of parts. For example, the panel assembly 50 includes a central upper panel 60, a central lower panel 70, a left upper panel 80A, a left lower panel 90A, a right upper panel 80B, and a right lower panel 90B as decorative parts. These decoration components are assembled to the skeleton component 100. Each component of the panel assembly 50 is formed of a resin material. For example, each component of the panel assembly 50 is molded from ABS resin or polypropylene.

Skeletal Parts

The skeleton component 100 is a framework of the panel assembly 50. The skeleton component 100 is a plate-like component. The skeleton component 100 extends from the center in the vehicle width direction to both sides. For example, the vehicle width dimension of the skeleton component 100 is determined to be 80% or more and 100% or less of the entire width of the vehicle. The skeleton component 100 has an arc shape in plan view. That is, the center portion in the vehicle width direction of the skeleton component 100 protrudes forward from both end portions in the vehicle width direction. During a front collision of the vehicle, the arc shape of the skeleton component 100 collapses. The collision load is absorbed by this deformation.

Figure 4:
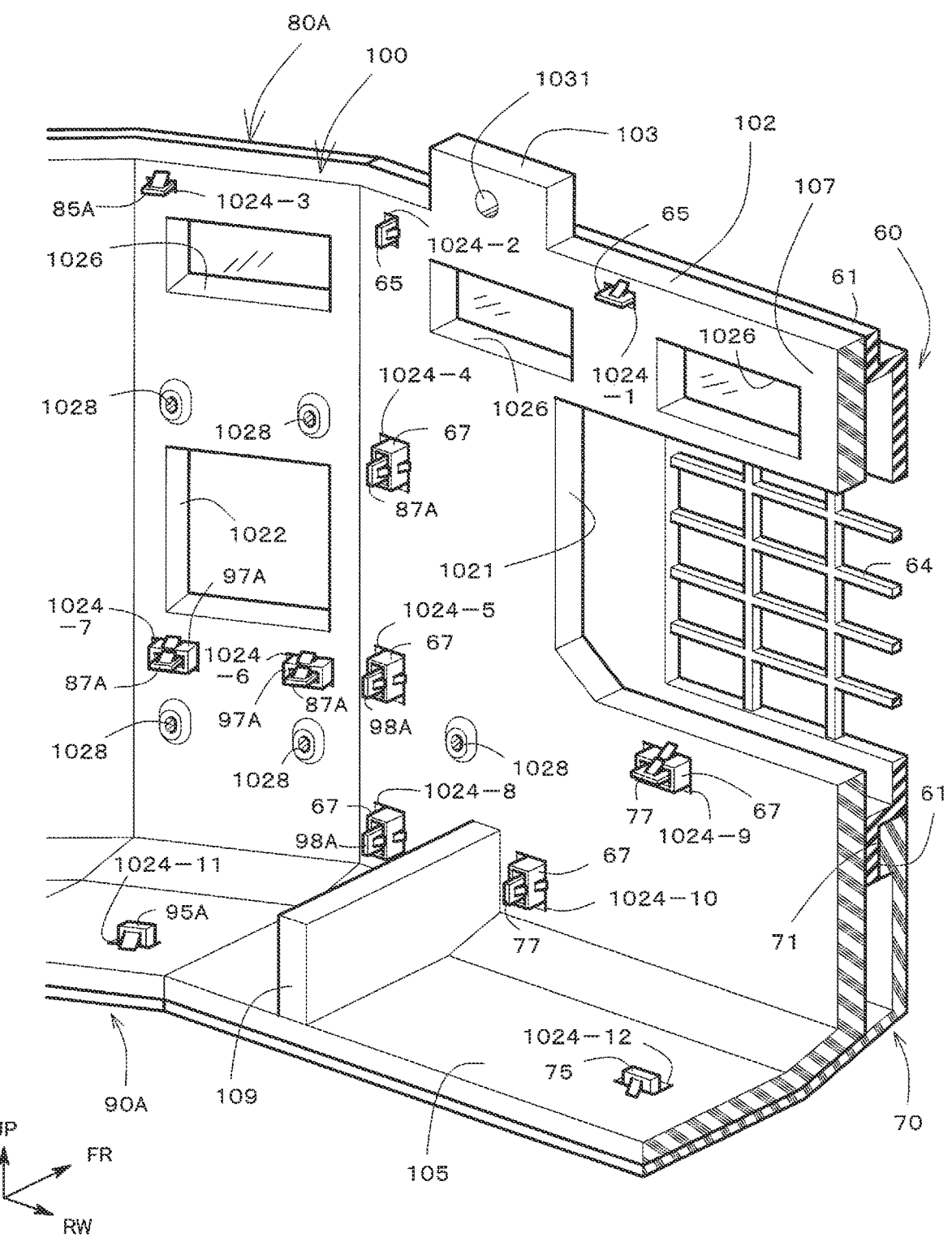
FIG. 4 is a perspective view illustrating a structure when the bumper assembly according to the present embodiment is assembled, and is a perspective view when the bumper assembly is viewed from a cross section taken along line A-A of FIG. 1.

For example, the skeleton component 100 is L-shaped in side view. For example, as illustrated in FIG. 4, the skeleton component 100 comprises a front plate 102 and a bottom plate 105. The front plate 102 faces forward. The bottom plate 105 faces downward.

For example, during a front collision of a vehicle, the panel assembly 50 (see FIG. 2) and the absorber assembly 110 deform while absorbing a collision load. The impact absorbing performance is required for the panel assembly 50, which is primarily responsible for the skeleton component 100. As an example, the skeleton component 100 is stronger than the decoration component. The decorative component includes a central upper panel 60, a central lower panel 70, a left upper panel 80A, a left lower panel 90A, a right upper panel 80B, and a right lower panel 90B. For example, the skeleton component 100 is formed thicker than the decoration component described above.

As illustrated in FIG. 2, the skeleton component 100 is arranged in front of the radiator support 40. Here, the skeleton component 100 is perforated with a plurality of holes. For example, the ventilation port 1021 is formed at the center of the skeleton component 100 in the vehicle width direction. The ventilation port 1021 is arranged in front of the rectangular opening 46 of the radiator support 40. In other words, the ventilation port 1021 faces the rectangular opening 46 of the radiator support 40. Also, the ventilation port 1021 is positioned behind the grille 64 of the central upper panel 60. By employing such an arrangement, outside air is supplied from the grille 64 to a radiator (not shown) through the grille 64 via the ventilation port 1021.

Also, as illustrated in FIG. 4, the radiator support 40 and the opposing surface 107 of the skeleton component 100 face each other. On the opposing surface 107, the buffle plate 109 is formed. For example, a pair of the buffle plates 109 is disposed outward relative to the ventilation port 1021 in the vehicle width direction. The buffle plate 109 is a vertical wall extending in the longitudinal direction of the vehicle. The buffle plate 109 sends the outside air taken in from the ventilation port 1021 to the radiator.

For example, the buffle plate 109 is formed in the skeleton component 100 while not formed in a decorative component such as the central upper panel 60. Since it is not necessary to provide the buffle plate 109, the degree of freedom of design for the decoration component is improved.

Also, the skeleton component 100 is formed with a pair of lamp openings 1022, 1022. A pair of lamp openings 1022 and 1022 are formed on both outer sides in the vehicle width direction of the ventilation port 1021. Lamp openings 1022 and 1022 are disposed behind the lamp opening 84A of the left upper panel 80A and the lamp opening 84B of the right upper panel 80B. For example, a fog lamp (not shown) is disposed at a position of the lamp openings 1022 and 1022. In order to suppress breakage of the lamp openings 1022 and 1022, reinforcing beams or grids may be disposed in the lamp openings 1022 and 1022.

Also, in the skeleton component 100, the clamp insertion hole 1028 is formed. For example, a plurality of the clamp insertion hole 1028 are formed around the lamp opening 1022. A wire harness clamp, which is a retaining component that retains a wire harness (not shown), is inserted into the clamp insertion hole 1028. For example, the wire harness is a wiring of a fog lamp (not shown).

Referring to FIG. 4, the opposing surface 107 of the skeleton component 100 faces the radiator support 40. From the opposing surface 107, the claws of the wire harness clamp are inserted into the clamp insertion hole 1028. In order to prevent the tip of the claw from protruding from the skeleton component 100, the peripheral portion of the clamp insertion hole 1028 is recessed rearwardly. That is, at the bottom of the depression is formed the clamp insertion hole 1028.

For example, the clamp insertion hole 1028 is formed in the skeleton component 100. On the other hand, the clamp insertion hole 1028 is not formed on a decorative component such as the central upper panel 60. Since there is no need to provide the clamp insertion hole 1028, the degree of freedom of design for the decoration component is increased.

The absorber openings 1026 are formed above the ventilation ports 1021 and lamp openings 1022 of the skeleton component 100. A plurality of the absorber openings 1026 are formed, for example, at intervals along the vehicle width direction.

As illustrated in FIG. 5, the front end portion of the absorber 116 is inserted into the absorber opening 1026. By employing such an arrangement, a collision load is transmitted directly from a decorative component such as the central upper panel 60 to the absorber 116 without interfering with the skeleton component 100. Details of this configuration will be described later.

As will be described later, a plurality of claws for assembly are formed in the decorative component. As a receiving destination of the clews, a plurality of claw insertion holes 1024 are formed in the skeleton component 100.

Decoration Parts

As illustrated in FIG. 2, the decorative component of the panel assembly 50 is divided into, for example, two parts in the vertical direction. Further, the decoration component is divided into three parts in the vehicle width direction. That is, the decorative component of the panel assembly 50 is divided into six panel components. More specifically, the panel assembly 50 includes a central upper panel 60, a central lower panel 70, a left upper panel 80A, a left lower panel 90A, a right upper panel 80B, and a right lower panel 90B as decorative parts. These decorations also have the exposed surface 62, 72, 82A, 82B, 92A and 92B. These exposed surfaces become part of the vehicle appearance. By incorporating these decoration components into the skeleton component 100, the skeleton component 100 is covered, for example, over the entire surface.

The central upper panel 60, the central lower panel 70, the left upper panel 80A, the left lower panel 90A, the right upper panel 80B, and the right lower panel 90B may have, for example, variations of a plurality of colors. Also, various patterns, such as a camouflage pattern, may be applied to the exposed surface 62, 72, 82A, 82B, 92A and 92B. Further, these decorative parts may have alternative parts of different shapes. As described above, since the variations of the respective decoration parts are rich, the design of the front surface of the vehicle can be customized according to the user's preference.

Figure 3:
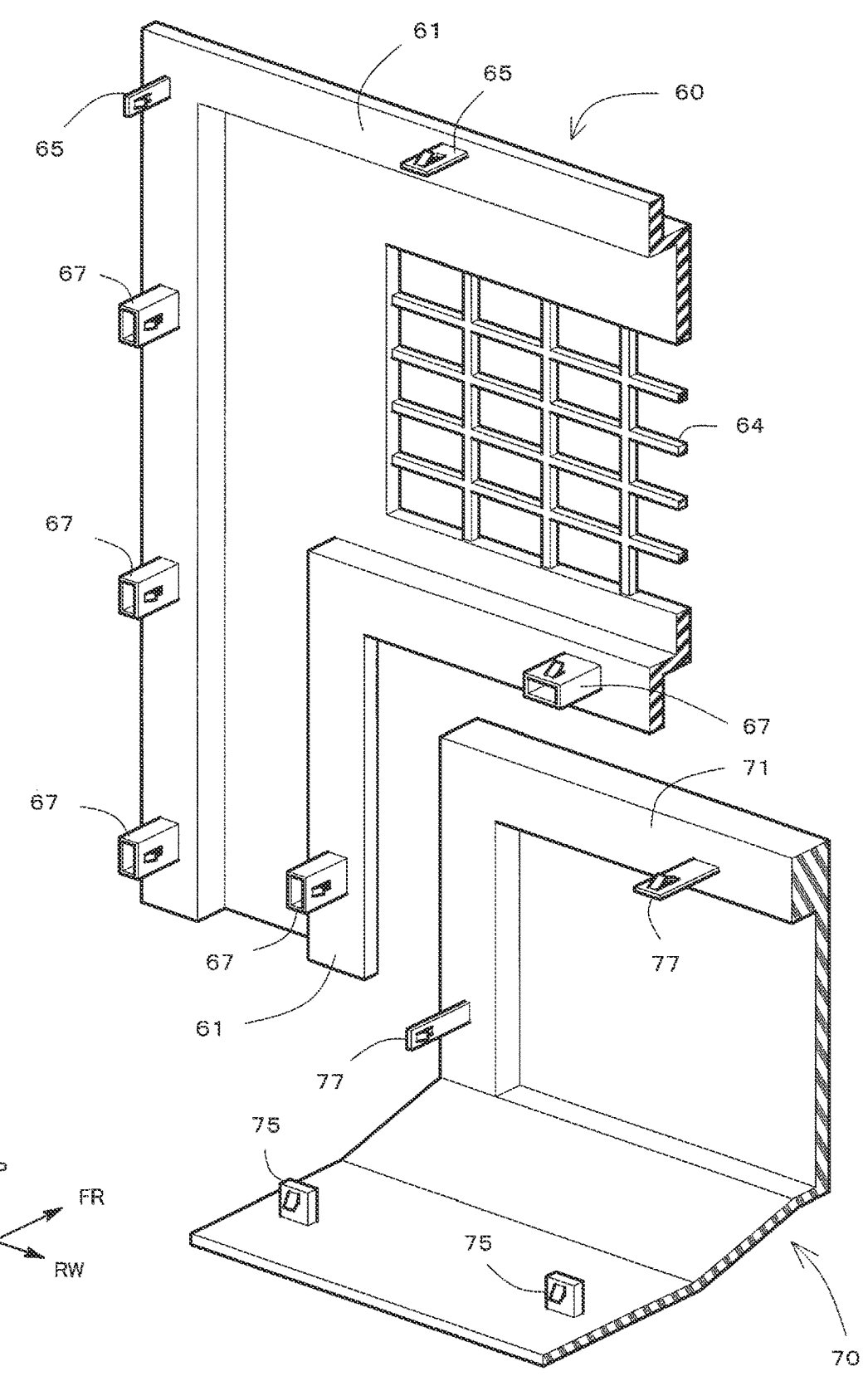
FIG. 3 is a perspective view illustrating a back surface structure of a skeleton component and a decoration component.

Each decoration piece comprises a flange around the periphery of the exposed surface 62, 72, 82A, 82B, 92A and 92B. For example, as illustrated in FIG. 3, flanges 61 and 71 are formed in the central upper panel 60 and the central lower panel 70. The flanges 61 and 71 are used to align the decoration members.

Further, in any of the decorative parts, a claw for assembly is formed on an opposing surface opposed to the exposed surface. For example, claw-attaching plates 75 and 77 are formed on opposite surfaces of the central lower panel 70. As described later, since the claw-attaching plate 77 is inserted into the claw-attaching cylinder 67, the claw-attaching plate 77 is longer than the claw-attaching plate 75.

A claw-attached plate 65 and a claw-attaching cylinder 67 are formed on the opposing surface of the central upper panel 60. The claw-attaching cylinder 67 is a square cylinder and extends through the exposed surface 62.

Assembly Structure of Panel Assembly

FIG. 4 shows an example in which the central upper panel 60, the central lower panel 70, the left upper panel 80A, and the left lower panel 90A are assembled to the skeleton component 100. Here, based on the symmetry of the vehicle appearance, the left upper panel 80A and the left lower panel 90A, and the right upper panel 80B and the right lower panel 90B have a bilaterally symmetrical structure. Therefore, in the following description, for convenience of explanation, the structure of the right upper panel 80B and the structure of the right lower panel 90B are omitted. However, when the suffix "A" denoted by the reference numeral is changed to "B", the description thereof will explain the structure of the right upper panel 80B and the right lower panel 90B.

In FIG. 4, different claws are inserted into the plurality of claw insertion holes 1024. For convenience of explanation, a number for identification is given to each of the claw insertion holes 1024.

First, the central upper panel 60 is assembled to the skeleton component 100. That is, the claw-attached plate 65 of the central upper panel 60 is inserted into the claw insertion holes 1024 (1024-1, 1024-2) of the skeleton component 100. The claw insertion hole 1024 (1024-4, 1024-5, 1024-8, 1024-9, 1024-10) is inserted with the claw-attaching cylinder 67.

A central lower panel 70 is then assembled to the skeleton component 100. That is, the claw-attaching plate 75 of the central lower panel 70 is inserted into the claw insertion hole 1024 (1024-12) of the skeleton component 100. Further, the claw-attaching plate 77 of the central lower panel 70 is inserted into the claw-attaching cylinder 67 (see 1024-9, 1024-10) of the central upper panel 60. By inserting the claw-attaching plate 77 into the claw-attaching cylinder 67, the central lower panel 70 is assembled to the skeleton component 100 in alignment with the central upper panel 60.

Similarly, the claw-attached plate 95A of the left lower panel 90A is inserted into the claw insertion hole 1024 (1024-11) of the skeleton component 100. The claw-attached plate 98A of the left lower panel 90A is inserted into the claw-attaching cylinder 67 (see 1024-5, 1024-8) of the central upper panel 60. Further, the claw-attaching cylinder 97A of the left lower panel 90A is inserted into the claw insertion hole 1024 (1024-6, 1024-7).

Further, the claw-attached plate 85A of the left upper panel 80A is inserted into the claw insertion hole 1024 (1024-3) of the skeleton component 100. Further, the claw-attached plate 87A of the left upper panel 80A is inserted into the claw-attaching cylinder 97A (see 1024-6, 1024-7) of the left lower panel 90A and the claw-attaching cylinder 67 (see 1024-04) of the central upper panel 60. Thereby, the left upper panel 80A is assembled to the skeleton component 100 in alignment with the left lower panel 90A and the central upper panel 60.

Instead of the claw-attached cylinder and the claw-attached plate, an insertion hole may be formed. For example, in the central upper panel 60 and the central lower panel 70, insertion holes are formed in the claw-attaching cylinder 67 instead of the claw-attaching plate 77. In this case, the insertion holes of the two panels and the claw insertion holes 1024 (1024-12) of the skeleton component 100 are aligned. Further, clips and clip receivers are inserted into these holes.

Alternatively, instead of the claw-attached plate, a plate piece may be provided. An insertion hole is formed in the plate piece. For example, the claw-attached plate 87A of the left upper panel 80A is changed to a plate piece. An insertion hole is formed in the plate piece in the thickness direction. The plate piece is inserted into the claw-attaching cylinder 97A (see 1024-6, 1024-7) of the left lower panel 90A and the claw-attaching cylinder 67 (see 1024-4) of the central upper panel 60. Further, the clip is inserted into the insertion hole of the plate piece. By inserting the clip into the insertion hole of the plate piece, the clip functions as described above. That is, the detachment of the plate piece and the claw-attached tube from the claw insertion hole 1024 (1024-4, 1024-6, 1024-7) of the skeleton component 100 is regulated by the clip.

Absorber Assembly

As illustrated in FIGS. 2 and 5, the bumper assembly 10 includes an absorber assembly 110. The absorber assembly 110 comprises the base 112 and the absorber 116.

The base 112 is the foundation of the absorber assembly 110. The base 112 is attached to the lower frame 44 of the radiator support 40. The base 112 extends in the vehicle width direction along the lower frame 44.

The absorber 116 extends forward from the base 112. The absorber 116 comprises, for example, a honeycomb structure as illustrated in FIG. 5 so that the absorber 116 can be broken step by step while receiving the impact load. That is, in the absorber 116, hexagonal rings are arranged forward. The ring has a central axis as a vertical axis. For example, a plurality of the absorbers 116 are arranged in the vehicle width direction.

The bumper assembly 10 is provided with a guide mechanism for guiding crush and deformation of the absorber 116 in the longitudinal direction of the vehicle during a frontal collision of the vehicle. For example, the guide bar 108 is formed on the opposing surface 107 of the skeleton component 100. The guide bar 108 extends rearwardly from the opposing surface 107. Further, a plurality of the guide bars 108 are arranged along the width direction of the vehicle in the opposing surface 107. For example, the guide bar 108 is formed to be wider toward the root side, i.e., toward the opposing surface 107.

In the base 112, the guide frame 114 is formed. The rear end of the guide bar 108 is inserted into the guide frame 114. Further, for example, a claw 1082 is formed at the rearmost end of the guide bar 108. The claw 1082 catches on the guide frame 114. Further, a stopper 1141 extending upward is formed in the guide frame 114. The claw 1082 and the stopper 1141 regulate the forward and backward movement of the guide bar 108.

At the time of a frontal collision of the vehicle, the stopper 1141 is broken to the guide bar 108. Then, the guide bar 108 moves rearward while being guided by the guide frame 114. When the guide bar 108 moves in the longitudinal direction of the vehicle, the absorber 116 is collapsed and deformed in the longitudinal direction of the vehicle.

Here, the absorber opening 1026 is formed at a portion of the skeleton component 100 facing the front end of the absorber 116. The absorber opening 1026 is larger than the absorber 116. For example, the front end of the absorber 116 is inserted into the absorber opening 1026 of the skeleton component 100. That is, the absorber 116 does not interfere with the skeleton component 100. For example, the front end of the absorber 116 abuts against the opposing surface (back surface) of the decoration component.

With such a structure, the collision load received by the decoration component is directly transmitted to the absorber 116 without passing through the skeleton component 100 when the front surface of the vehicle collides. In other words, the impact load received by the decoration component is distributed between the skeleton component 100 and the absorber 116. Accordingly, the bending deformation of the skeleton component 100 and the crush deformation of the absorber 116 proceed simultaneously.

The present disclosure is not limited to the present embodiments described above, and includes all changes and modifications without departing from the technical scope or the essence of the present disclosure defined by the claims.

The invention claimed is:

1. A bumper assembly comprising:

a skeleton component extending from a center to both sides in a vehicle width direction;

a plurality of decorative parts attached to the skeleton component;

wherein each of the plurality of decorative parts has an exposed surface, the exposed surface being part of a vehicle appearance, and wherein the skeleton component has an insertion hole, through which a holding component for holding a wire harness is insertable.

2. The bumper assembly according to claim 1, wherein the skeleton component is disposed in front of a radiator support, the radiator support including a rectangular frame portion, wherein the skeleton component comprises a ventilation port formed therein, the ventilation port facing a rectangular opening of the radiator support;

wherein the skeleton component includes an opposing surface facing the radiator support, and a baffle plate formed on the opposing surface, the baffle plate disposed outward relative to the ventilation port in the vehicle width direction, and the baffle plate extending in a front-rear direction.

3. The bumper assembly according to claim 2, further comprising a base attached to the radiator support;

an absorber extending forward from the base;

wherein a guide bar is formed on the opposing surface of the skeleton component, the guide bar extending rearward, and wherein a guide frame is formed on the base, a rear end of the guide bar inserted into the guide frame.

4. The bumper assembly according to claim 3, wherein a portion of the skeleton component facing a front end of the absorber has an opening, the opening being larger than the front end of the absorber.

5. A bumper assembly comprising:

a skeleton component extending from a center to both sides in a vehicle width direction;

a plurality of decorative parts attached to the skeleton component;

wherein each of the plurality of decorative parts has an exposed surface, the exposed surface being part of a vehicle appearance;

wherein the skeleton component is disposed in front of a radiator support, the radiator support including a rectangular frame portion;

wherein the skeleton component comprises a ventilation port formed therein, the ventilation port facing a rectangular opening of the radiator support; and wherein the skeleton component includes an opposing surface facing the radiator support, and a baffle plate formed on the opposing surface, the baffle plate disposed outward relative to the ventilation port in the vehicle width direction, and the baffle plate extending in a front-rear direction.

6. The bumper assembly according to claim 5, further comprising a base attached to the radiator support;

an absorber extending forward from the base;

wherein a guide bar is formed on the opposing surface of the skeleton component, the guide bar extending rearward, and wherein a guide frame is formed on the base, a rear end of the guide bar inserted into the guide frame.

7. The bumper assembly according to claim 6, wherein a portion of the skeleton component facing a front end of the absorber has an opening, the opening being larger than the front end of the absorber.

* * * * *